United States Patent
Cherian et al.

(10) Patent No.: US 11,822,580 B2
(45) Date of Patent: Nov. 21, 2023

(54) SYSTEM AND METHOD FOR OPERATING A DIGITAL STORAGE SYSTEM

(71) Applicant: Ionir Systems Ltd., Tel-Aviv (IL)

(72) Inventors: Jacob Cherian, Tel-Aviv (IL); Nir Peleg, Tel-Aviv (IL); Or Sagi, Tel-Aviv (IL)

(73) Assignee: Ionir Systems Ltd., Tel Aviv (IL)

( * ) Notice: Subject to any disclaimer, the term of this patent is extended or adjusted under 35 U.S.C. 154(b) by 0 days.

(21) Appl. No.: 17/575,911

(22) Filed: Jan. 14, 2022

(65) Prior Publication Data

US 2022/0138230 A1 May 5, 2022

Related U.S. Application Data

(63) Continuation of application No. 16/412,647, filed on May 15, 2019, now Pat. No. 11,226,990.

(60) Provisional application No. 62/701,023, filed on Jul. 20, 2018.

(51) Int. Cl.
*G06F 16/22* (2019.01)
*G06F 9/451* (2018.01)
*G06F 16/28* (2019.01)

(52) U.S. Cl.
CPC ............ *G06F 16/285* (2019.01); *G06F 9/451* (2018.02); *G06F 16/22* (2019.01)

(58) Field of Classification Search
CPC ........ G06F 9/451; G06F 16/22; G06F 16/285; G06F 16/24573
See application file for complete search history.

(56) References Cited

U.S. PATENT DOCUMENTS

| | | | |
|---|---|---|---|
| 5,432,922 A | 7/1995 | Polyzois | |
| 5,659,614 A | 8/1997 | Bailey, III | |
| 9,298,417 B1* | 3/2016 | Muddu | G06F 16/185 |
| 2002/0133716 A1 | 9/2002 | Harif | |
| 2004/0243944 A1* | 12/2004 | Sabiers | G06F 9/451 |
| | | | 715/854 |
| 2007/0214011 A1 | 9/2007 | Demers | |
| 2007/0220061 A1* | 9/2007 | Tirosh | H04L 63/20 |
| 2008/0086485 A1* | 4/2008 | Paper | G06Q 10/10 |
| 2009/0177757 A1 | 7/2009 | Pottenger | |
| 2009/0282067 A1* | 11/2009 | Bendigeri | G05B 19/042 |
| | | | 717/136 |
| 2010/0122265 A1* | 5/2010 | Beckley | G06F 16/907 |
| | | | 719/313 |
| 2014/0365734 A1 | 12/2014 | Bridge, Jr. | |
| 2015/0052448 A1 | 2/2015 | Brooks | |
| 2015/0095643 A1* | 4/2015 | Adams | G06F 21/6218 |
| | | | 713/165 |
| 2015/0154285 A1 | 6/2015 | Saarinen | |
| 2016/0171084 A1 | 6/2016 | Kraley | |
| 2016/0196337 A1* | 7/2016 | Epstein | H04W 4/021 |
| | | | 707/724 |
| 2018/0054327 A1 | 2/2018 | Ameling | |
| 2018/0150403 A1 | 5/2018 | Avudaiyappan | |
| 2021/0272128 A1* | 9/2021 | Slawson | G06F 40/30 |

\* cited by examiner

*Primary Examiner* — Etienne P Leroux
(74) *Attorney, Agent, or Firm* — PEARL COHEN ZEDEK LATZER BARATZ LLP

(57) ABSTRACT

A system and method for managing a storage system may include generating, for a data block, a set of tags and a unique name. A set of tags may represent a context. A service related to the data block may be provided in response to receiving at least one of: a tag, a set of tags and a unique name.

20 Claims, 7 Drawing Sheets

ENTRIES FOR
DATA BLOCK A
IN THE TAG
DATABASE

| | TAG SETS | | NAME |
|---|---|---|---|
| 300 | BLOCK VOL A | OFFSET = 0x100 | 0xFB092EE5 |
| 301 | BLOCK VOL B | OFFSET = 0x020 | 0x9D9923F0 |
| 301 | PICTURE FILE 33 | DATA CHUNK 300 | 0xFB092EE5 |
| 302 | PICTURE FILE 21 | DATA CHUNK 250 | 0x79586572 |
| 302 | BLOCK VOL B | OFFSET = 0x130 | 0xFB092EE5 |

510

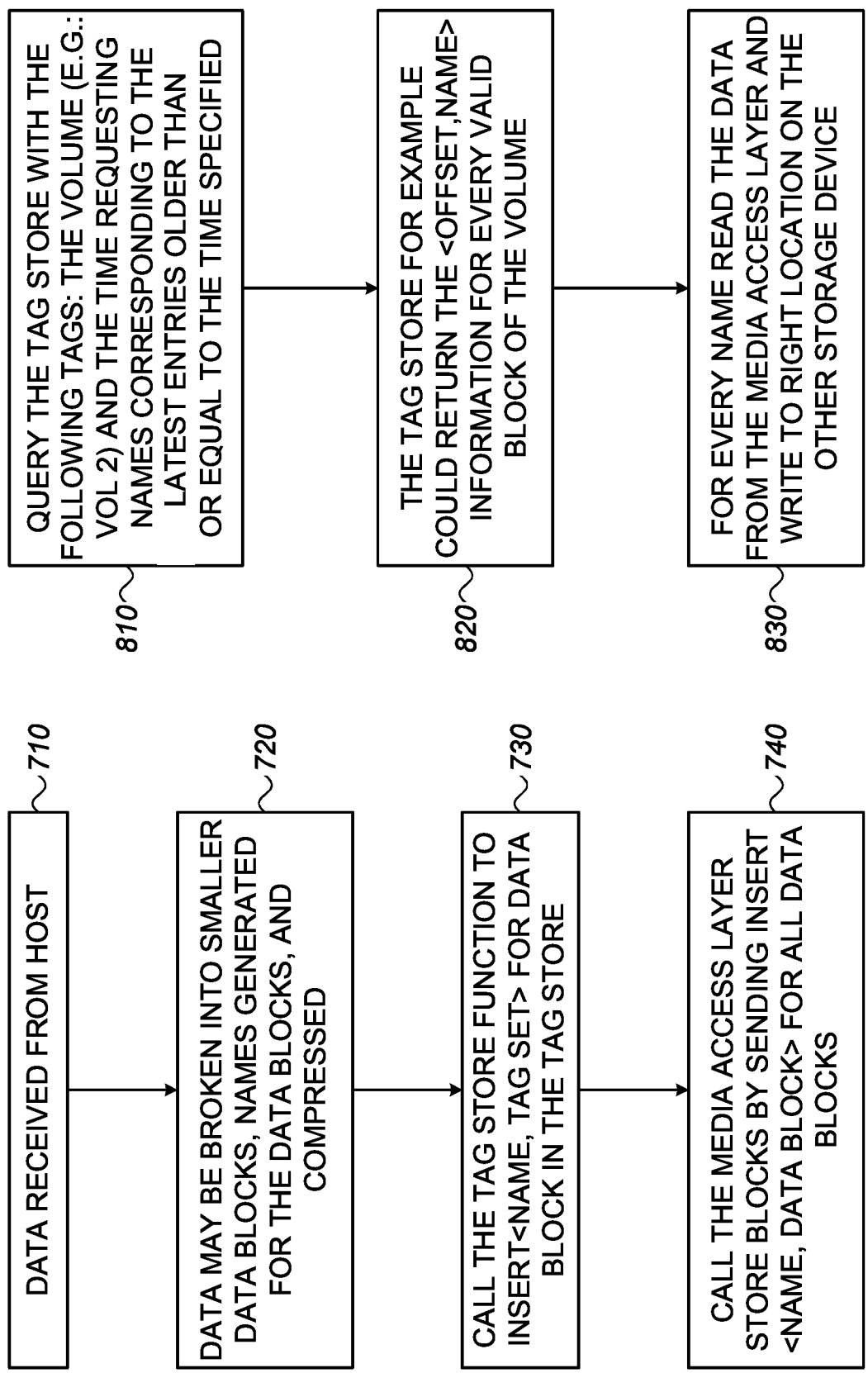

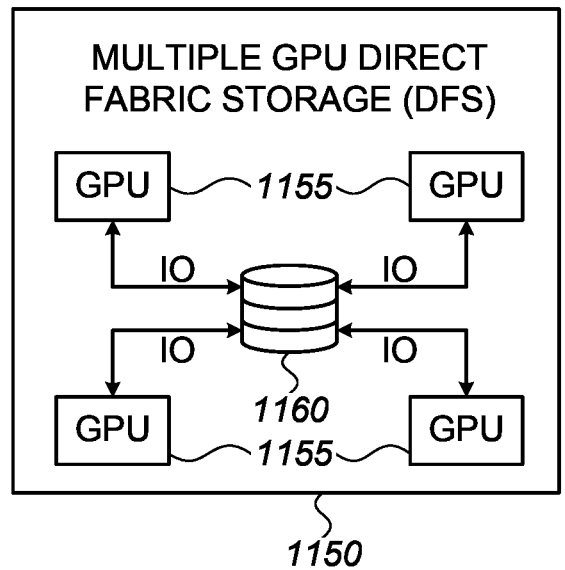
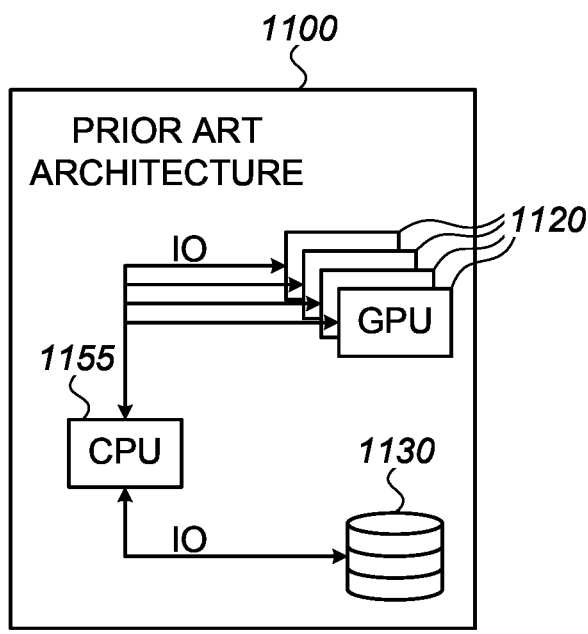
FIG. 11

SYSTEM AND METHOD FOR OPERATING A DIGITAL STORAGE SYSTEM

CROSS-REFERENCE TO RELATED APPLICATIONS

This application is a continuation application of U.S. patent application Ser. No. 16/412,647 entitled "System And Method For Operating A Digital Storage System" filed on May 15, 2019, which will issue as U.S. Pat. No. 11,226,990 on Jan. 18, 2022, and which claims the benefit of U.S. Provisional Patent Application No. 62/701,023, entitled "System And Method For Operating A Digital Storage System", filed on Jul. 20, 2018, which are all incorporated herein by reference in their entireties.

FIELD OF THE INVENTION

The present invention relates generally to computer storage systems. More specifically, the present invention relates to a data storage operating system (OS).

BACKGROUND OF THE INVENTION

Storage of digital content is used by computer applications, users and computer systems as known in the art. Digital content is typically stored in data blocks which may be associated with a user, an application, a file or any other object. Typically, to store or retrieve data in/from a storage system, a client needs to specify a reference, e.g., a file name or a physical location on disk.

However, current storage systems and methods do not enable a client to store, retrieve or manipulate data in a storage system based on a logical context of the data.

SUMMARY OF THE INVENTION

An embodiment for managing a storage system may include generating, for a data block, a set of tags (e.g. a tag set or group) and a unique name; associating the tag set and unique name in a database; receiving a request including at least one tag; and providing at least one service related to the data block based on the received tag, tag set and unique name.

An embodiment may store a data block in a storage system and may associate information usable for retrieving the data block with the unique name. An embodiment may perform an action related to a data block based on matching data in a request with a tag set. An embodiment may dynamically modify a tag set. An embodiment may associate a data block with a plurality of tag sets. An embodiment may alert a client based on a registration, the registration including at least one tag.

An embodiment may use tag sets and unique names to automate a procedure related to at least one of: data backup, data restore, data copy, periodic maintenance operation and data retention. A unique name may be generated based on the content of a data block. A service provided by an embodiment may be selected based on a logical context defined by a tag set. A service may be selected based on a rule applied to a set of tag sets.

An embodiment may include a memory and a controller adapted to generate, for a data block, a set of tags (tag set) and a unique name; associate the tag set and unique name in a database; receive a request including at least one tag; and provide at least one service related to the data block based on the received tag, tag set and unique name.

An embodiment may include a unit module (also referred to herein as layer) adapted to provide an interface with a media storage system based on a unique name and a data object. The terms "unit", "module" and "layer" as referred to herein may relate to the same thing and may be used herein interchangeably. An embodiment may include a core layer adapted to generate and maintain tag sets and unique names; a media layer adapted to store and retrieve data blocks according to unique names; and an Application Programming Interface (API) combining interfaces of the core layer and the media layer. An embodiment may include a controller adapted to store a data block in a storage system and associate information usable for retrieving the data block with the unique name.

An embodiment may include a controller adapted to provide a data block based on matching data in a request with a tag set. An embodiment may include a controller adapted to dynamically modify a tag set. An embodiment may include a controller adapted to associate a data block with a plurality of tag sets. An embodiment may include a controller adapted to alert a client based on a registration, the registration including at least one tag. An embodiment may include a controller adapted to use tag sets and unique names to automate a procedure related to at least one of: data backup, data restore, data copy, periodic maintenance operation and data retention. A service may be selected based on a context rule applied to a set of tag sets. Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 7 shows a write operation according to illustrative embodiments of the present invention;

FIG. 8 shows a flow according to illustrative embodiments of the present invention;

FIG. 11 shows a prior art system and a system and flows according to illustrative embodiments of the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method.

Figure 1:
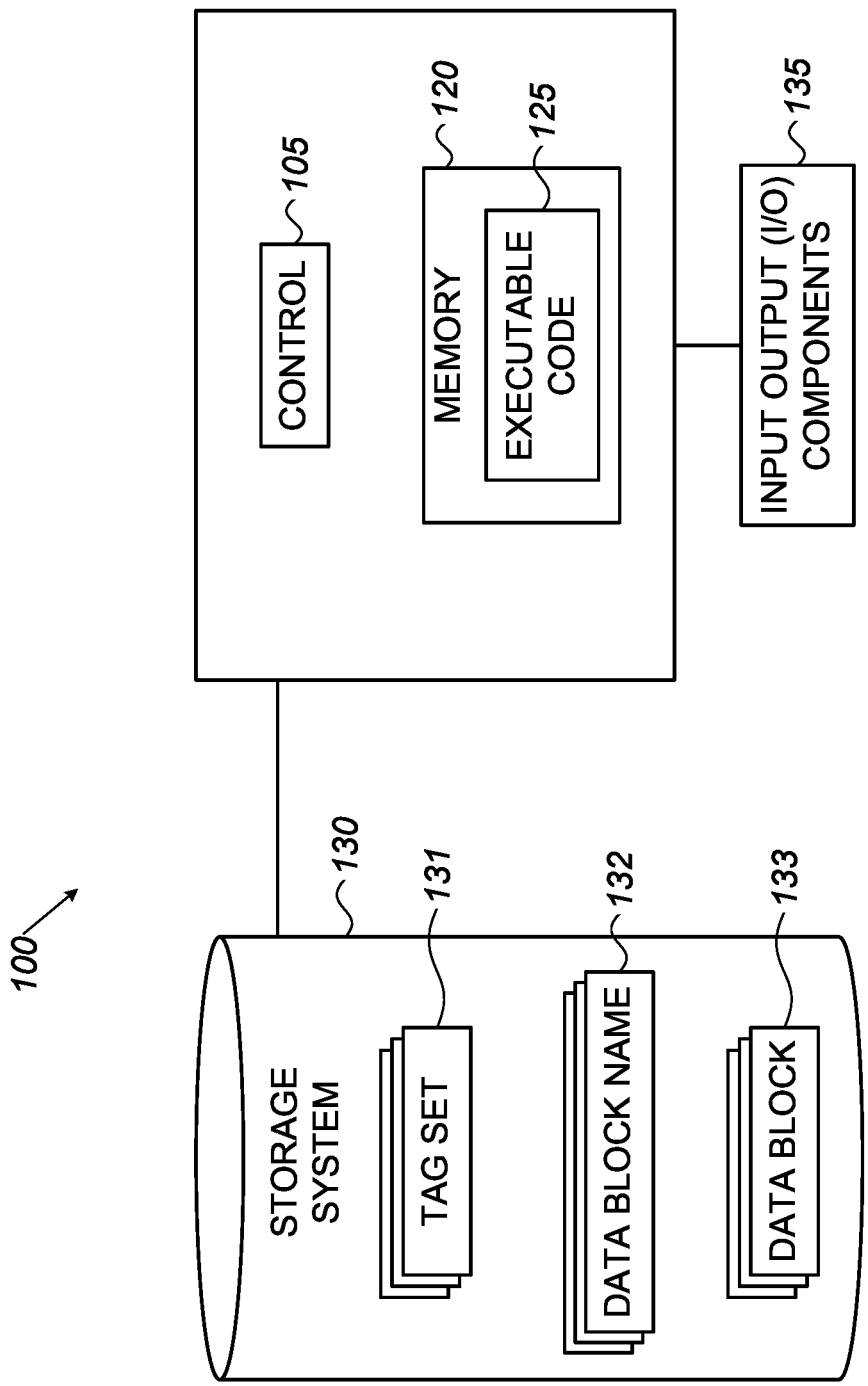
FIG. 1 shows block diagram of a computing device according to illustrative embodiments of the present invention.

Reference is made to FIG. 1, showing a non-limiting block diagram of a computing device or system 100 that may be used to operate a storage system according to some embodiments of the present invention. Computing device 100 may include a controller 105 that may a hardware controller. For example, computer hardware processor or hardware controller 105 may be, or may include, a central processing unit processor (CPU), a chip or any suitable computing or computational device. Computing system 100 may include a memory 120, executable code 125, a storage system 130 and input/output (I/O) components 135. Controller 105 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing devices 100 may be included in, and one or more computing devices 100 may be, or act as the components of, a system according to some embodiments of the invention.

Memory 120 may be a hardware memory. For example, memory 120 may be, or may include machine-readable media for storing software e.g., a Random-Access Memory (RAM), a read only memory (ROM), a memory chip, a Flash memory, a volatile and/or non-volatile memory or other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

Executable code 125 may be an application, a program, a process, task or script. A program, application or software as referred to herein may be any type of instructions, e.g., firmware, middleware, microcode, hardware description language etc. that, when executed by one or more hardware processors or controllers 105, cause a processing system or device (e.g., system 100) to perform the various functions described herein.

Executable code 125 may be executed by controller 105 possibly under control of an operating system. For example, executable code 125 may be an application that operates or manages a storage system as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein, e.g., each of data application 210, core module 220 and media access module 230, may be, or may include, controller 105, memory 120 and executable code 125.

Storage system 130 may be or may include, for example, a hard disk drive, a universal serial bus (USB) device or other suitable removable and/or fixed storage unit. As shown, storage system 130 may include tag sets or groups 131, data block names 132 and data blocks 133 (collectively referred to hereinafter as tag sets 131, data blocks 133 and/or data block names 132 or individually as a tag set 131, a data block 133 and/or a data block name 132, merely for simplicity purposes).

Although shown as separate objects, tag sets 131 and data block names 132 may be included in one or more objects, e.g., in a database, such that given a tag set 131, the associated data block name 132 can be quickly identified, located and/or retrieved. Likewise, tag sets 131 and data block names 132 may be stored such that given a data block name 132, all a tag sets 131 associated with the data block can be readily and quickly identified, located and/or retrieved.

As referred to herein, associating a tag set 131 (or a data block name 132) with a data block 133 may include generating, including or arranging digital information (e.g., in a database in storage system 130) such that given a tag set 131, an associated data block 133 can be quickly found and/or retrieved. For example, associating a tag set 131 with a data block 133 may include adding a pointer or reference to the tag set 131 or associating a tag set 131 with a data block 133 may be achieved by including the tag set 131 and a reference to the data block 133 in the same entry or row in a table, list or database. It will be understood that the scope of the invention is not limited by the way tag sets 131 are linked to, or associate with, data blocks 133.

Tag sets 131 and data block names 132 as referred to herein may be any suitable digital data structures, constructs or computer digital data objects that enable storing, retrieving and modifying values. For example, tag sets 131 and data block names 132 may be, or may be included in, files, tables or lists in a database in storage system 130, and may include a number of fields that can be set, modified, cleared and so on. For example, entries may be added to a table or list to indicate or represent an association of a data block with a tag as further described herein.

Data blocks 133 may be any suitable object usable for storing digital information, for example, a data block may be a number of contiguous bytes in a hard disk, an object stored in a block or object storage system or any chunk of digital data. It will be noted that, in some embodiments, tag sets 131 and data block names 132 are stored in a first storage system or device and data blocks 133 are stored in a second, different storage system or device. For example, tag sets 131 and data block names 132 may be stored in a fast (possibly expensive) storage system and data blocks 133 may be stored in mass storage device that may be slower but cheaper. A mass storage device may be, for example, a device similar to storage system 130 that may be optimized for storage capacity but not necessarily for speed.

Content may be loaded from storage system 130 into memory 120 where it may be processed by controller 105. For example, a tag set 131 may be loaded into memory 120, controller 105 may add a tag to the tag set 131 in memory 120 to produce an updated tag set 131 and then store the updated tag set in storage system 130.

I/O components 135 may be, may be used for connecting (e.g., via included ports) or they may include: a mouse; a keyboard; a touch screen or pad or any suitable input device. I/O components may include one or more screens, touchscreens, displays or monitors, speakers and/or any other suitable output devices. Any applicable I/O components may be connected to computing device 100 as shown by I/O components 135, for example, a wired or wireless network interface card (MC), a universal serial bus (USB) device or an external hard drive may be included in I/O components 135.

A system according to some embodiments of the invention may include components such as, but not limited to, a plurality of central processing units (CPU) or any other suitable multi-purpose or specific processors, controllers, microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components. A system may include or may be, for example, a workstation, a server computer, a network device, or any other suitable computing device.

Embodiments of the invention may include a data storage OS that provides context based interface and operations related to data. As described, sets of tags and unique names associated with data blocks may be used for providing clients of a system with a context based view and interface, thus enabling clients of a system to request and receive services based on any logical context of the data and further relieving clients from having to deal with details of an underlying storage system. When used herein, a name that is "unique" is typically within a system or set of names according to an embodiment of the invention.

Figure 2:
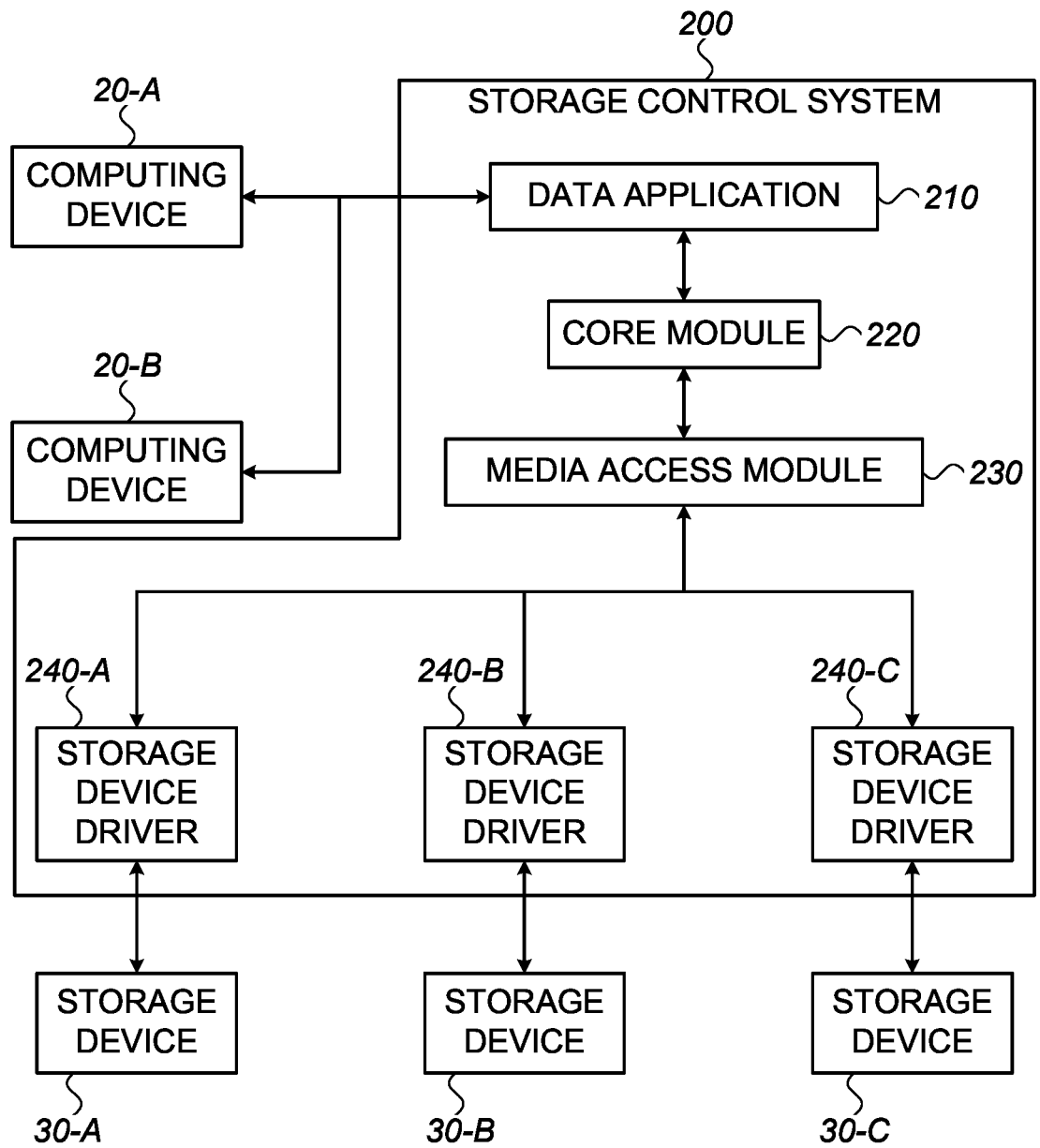
FIG. 2 shows a system according to illustrative embodiments of the present invention.

Reference is made to FIG. 2, an overview of a storage control system 200 and flows according to some embodiments of the present invention. As described, system 200 or components of system 200 may be, or may include, components such as those shown in FIG. 1.

As shown, system 200 may include a data application module 210, a core module 220, a media access module 230, a plurality of storage device driver modules 240-A, 240-B and 240-C, and system 200 may include or may be connected to a plurality of storage devices or systems 30-A, 30-B and 30-C. Of course, in some embodiments, only one, single storage device driver (e.g., module 240-A) is included in system 200 and may be used, e.g., to operatively connect system 200 to a single storage device (e.g., storage device 30-A).

Computing devices 20-A and 20-B may be any suitable computing device (e.g., similar to computing device 100) and may be used by clients of system 200. Clients of system 200 may be, for example, users who store/retrieve data in/from system 200 and/or applications that store/retrieve data in/from system 200 and/or devices, e.g., computing devices 20-A and 20-B as shown in FIG. 2. For example, computing device 20-A may be used by a user or application to store and/or retrieve data from system 200 as described herein.

In some embodiments, core module 220 associates data blocks 133 with one or more tag sets 131. A tag set 131 may represent, or include, a context of and/or other attributes of the data block 133 with which it is associated. Generally, a context may include, or be determined or defined based on, any relevant or applicable attribute or aspect, e.g., a context may be, may include, or may be defined based on, one or more of: an indication or identification of a storage media, e.g., a name, or a reference to, a data volume, a hard drive or other applicable media or storage system or object; a name or other reference to a digital content object; an offset in a data block; a date and time or timestamp value; a source of data block; a type of the actual data or content in a data block; a usage of data in a data block etc. It is noted that since a context may be represented by tag sets, and tags to be included in tag sets may be freely defined, any user-defined context, dynamically or automatically defined context, or other contexts may be defined and used by a system as described.

For example, a first tag set 131 may be created for a context of a first application (e.g. a program, a software module, an instance of a program, etc.) or user and may be associated with a data block 133 and a second tag set 131 may be created for a second application or user and may be associated with the same data block 133. Accordingly, a plurality of tag sets 131 may be associated with a single data block 133 thus enabling different views, makings or usages of a single data block.

In some embodiments, a tag set 131 includes a set of tags that together represent a logical context or other attribute of data, with respect to a user, application or owner of at least a portion of a data block 133. For example, a first tag set 131 may be created for a first application and may be associated with a first offset in a data block 133 (e.g., the first offset is where the data of interest for the first application is stored within the data block 133) and a second tag set 131 may be created for a second application and may be associated with a second offset in the same data block 133, e.g., since that is where data of interest for the second application is stored. Accordingly, tag sets as described provide a virtualization layer on top of data blocks providing each client of a storage system with its own view of the storage system.

Figure 3:
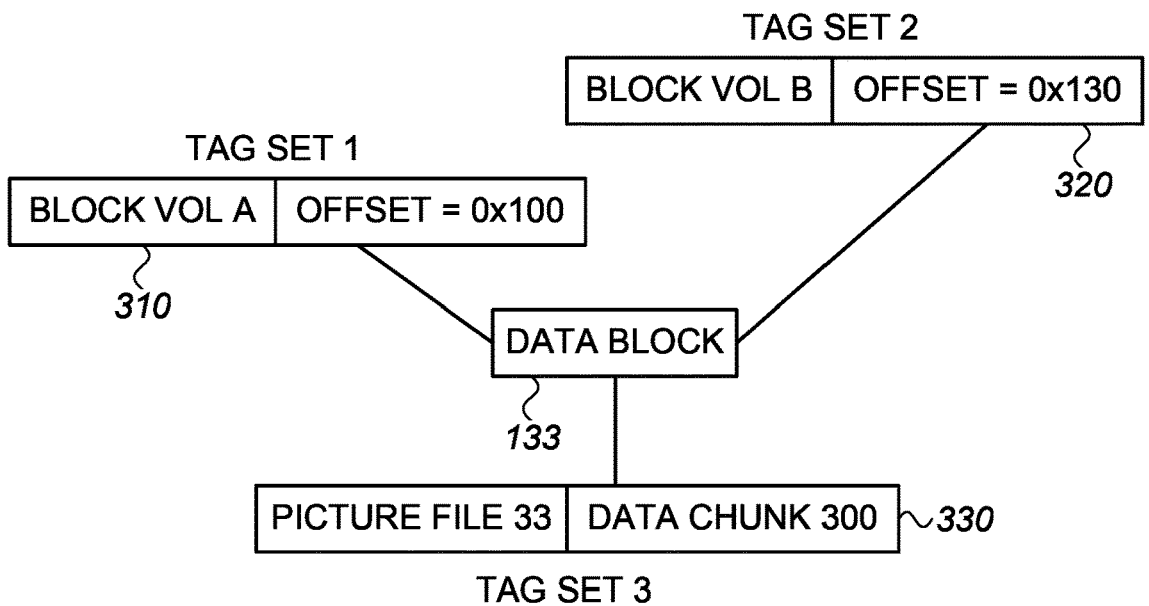
FIG. 3 shows tags associated with a data block according to illustrative embodiments of the present invention.

Reference is made to FIG. 3, which shows tag sets associated with a data block. As further described herein, associating a tag set 131 and/or a data block name 132 with a data block 133 may include creating and arranging digital information such that a tag set 131 and/or a data block name 132 is/are linked to data block 133. As described, an association of a tag sets with a data blocks enable finding, retrieving or obtaining a data block given, or based on, a tag set, an association as described may enable finding, retrieving or obtaining a tag set based on a data block.

As shown, a plurality of tag sets 310, 320 and 330 may be associated with a single data block 133 and each tag set represents a different context of the data block. As further shown, each of the tag sets include a set of tags. For example, and as shown in FIG. 3, tag set 310 includes a block volume name or reference (first tag in the tag set) and an offset in the data block 133 (second tag in the tag set) and tag set 330 also includes two tags, an indication or type of a file and a reference to a data chunk in data block 133. Although block or data volume is mainly referred to herein, for simplicity, it will be understood that any media and/or object may be used where applicable, e.g., a file, a hard disk segment or any application specific entity.

It will be understood that any number of tag sets 131 can be associated with a single or same data block 133. For example, when a new application or user starts using system 200, a new tag set 131 may be created for the new user or application and the new tag set 131 may be associated with data blocks provided by the new user or application and/or the new tag set 131 may be associated with data blocks that may have been stored in the system long before the new user or application started using the system.

Although only two tags are shown in each of tag sets 310, 320 and 330, it will be understood that any number of tags may be included in a tag set 131. For example, tags related to time, user or application name, location in storage, type of content and the like may be included in a tag set. Accordingly, any relevant aspect of, or context related to data in a data block may be reflected, represented or included in a tag set 131 as described herein, and, a given block of data can have multiple logical contexts associated with it (using tag sets as described) where each context represents a different aspect, e.g., different application or different regions in the data associated with a given application.

In some embodiments, tag sets 131 are associated with names of, or other references to, data blocks 133. For example, tag sets 131 may be associated with globally, or system unique names that are generated for data blocks 133. A unique name as referred to herein may be unique within a specific instantiation of the invention, but not be unique when compared with the universe of names of data blocks stored on all existing computer systems. For example, a secure hash generated based on the content of a data block 133 may be, or may provide, a globally unique name for the specific data block 133 in a storage system. A unique name or reference for a data block may be defined and generated based on the actual content of a data block 133.

Figure 4:
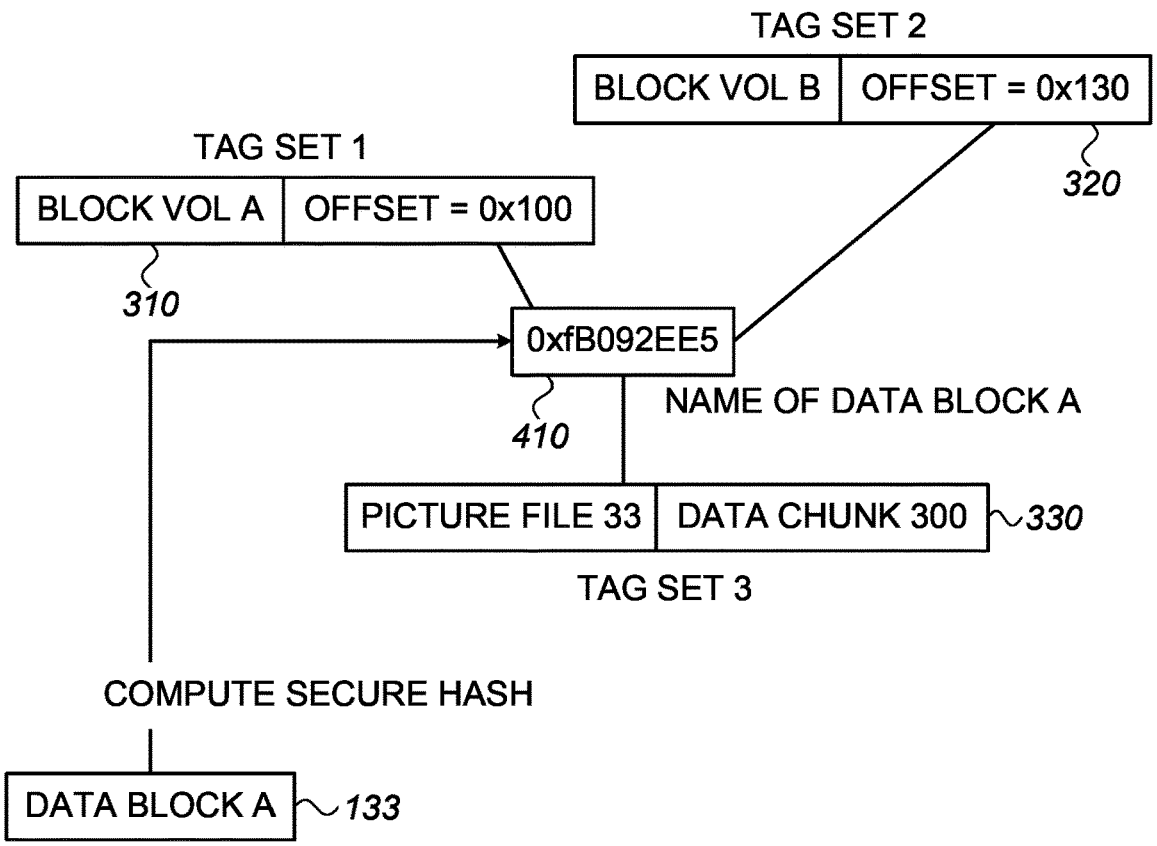
FIG. 4 illustrates association of tag sets with a data block name according to illustrative embodiments of the present invention.

Reference is made to FIG. 4, showing association of tag sets with a data block name. As shown, a name 410 for data block 133 may be generated, e.g., by core module 220, by calculating a secure hash value that may be unique for the content in data block 133. Accordingly, if the content in a first and second data blocks 133 is different than the names calculated for the first and second blocks will be different, similarly, the same names may be generated for two different data blocks 133 if the data blocks include identical content. Any method for generating unique names or references for data blocks may be used. It will be understood that a unique name as referred to herein may be unique within a specific instantiation of the invention, but not be unique when compared with the universe of names of data stored on all existing computer systems.

In some embodiments, names of data blocks 133 and their associated tag sets are stored in a tag database, e.g., included in or operatively connected to, data core module 220. Using a database that includes (and associates) unique names of data blocks 133 and associated tag sets 131, core module 220 (or a database therein) may support various operations or interfaces. For example, core module 220 may receive a request that includes a tag or tag set and respond with an associated name or a combination of a name and tag set. In another example, core module 220 may, in response to a request, add a new name/tag set combination and/or add a tag to an existing tag set. In yet other cases, core module may receive a request (or registration) to be notified when a specific event related to any one of: a name, tag or tag set occurs. For example, a user may request to be notified each time a data block 133 associated with a specific tag set is accessed or retrieved.

Figures 5, 6:
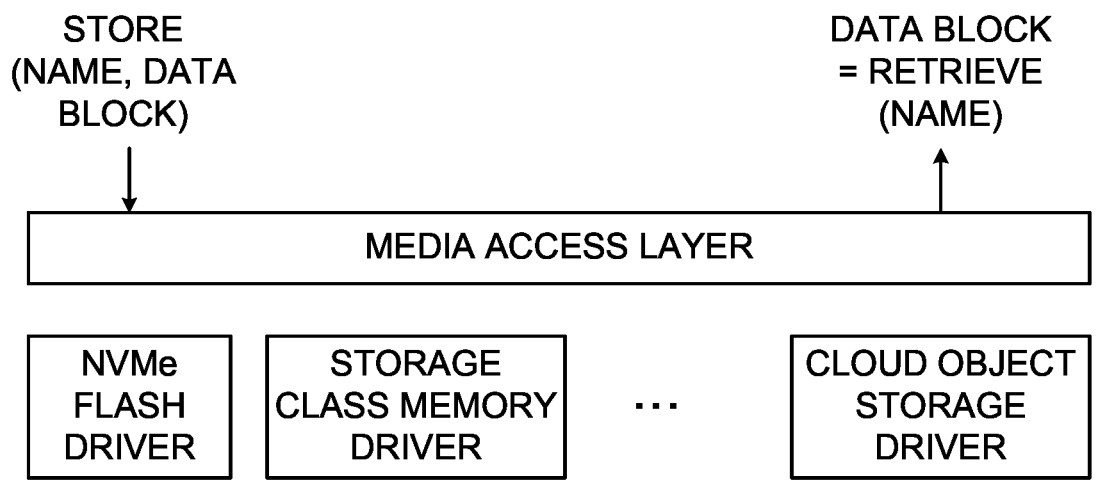
FIG. 5 illustrates data in a database according to illustrative embodiments of the present invention.
FIG. 6 shows a media access layer according to illustrative embodiments of the present invention.

Reference is made to FIG. 5, showing a conceptual representation of a database according to illustrative embodiments of the present invention. As shown by table 510, each entry may include a tag set 131 and name of the data block 133 associated with the tag set. It will be understood that any number of additional columns may be added to table 510 to enable any size or number of tags in a tag set. Entries in table 510 may include metadata, e.g., metadata included, per entry, in database 510, may be a sequence number that may represent order of entries in time, a timestamp and so on. An arrangement of data as illustrated in FIG. 5 enables various operations and services, e.g., search for, retrieve and/or provide all data blocks 133 associated with a specific tag set 131, search for, retrieve and/or provide all tag sets 131 associated with a specific data block 133 and so on. Other operations or services performed or provided by embodiments using a database as illustrated by table 510 may be providing data block names in response to a tag (e.g., all data blocks associated with a tag), adding new <name, tag set> entries and add tags, adding new tags to existing tag sets, alert users or applications when an event occurs based on a registration, e.g., a registration for a specific tag set, data block name and/or a specific event.

Storage of the actual data (the data or content in/of data blocks 133) may be performed by media access module 230 and one of drivers 240-A, 240-B and/or 240-C. Generally, media access module or layer 230 provides a mechanism to store and access data from different types of media with a single common interface that is independent of the details of the underlying media. The individual media drivers (e.g., drivers 240-A, 240-B and/or 240-C) deal with the details of the supported media types.

In some embodiments, media access layer 230 provides (or exports) functions that allow the storage and retrieval of arbitrary sized data blocks. For example, media access layer 230 may, based on a request that includes data and a name, store a data block with a name, or, provided with a name, media access layer 230 may retrieve a data block associated with the name. Any other operations related to data blocks, names and tag sets may be performed.

In some embodiments, media access layer 230 handles the storage of the actual data blocks using media drivers (e.g., drivers 240-A, 240-B and/or 240-C). In some embodiments, media access layer 230 provides a mechanism to store and access data, on/from any type of media, with a single common interface that is independent of the details of the underlying media. The individual media drivers (e.g., drivers 240-A, 240-B and/or 240-C) deal with the details of the supported media types. In some embodiments, media access layer 230 exports, supports or provides functions that allow the storage and retrieval of arbitrary sized data blocks.

Reference is made to FIG. 6, showing a conceptual representation of a media access layer according to illustrative embodiments of the present invention. As shown, the underlying media may be flash storage handled by a flash drive, a cloud based storage handled by a suitable driver etc. As further illustrated in FIG. 6, media access layer 230 may provide a storage service (or storage operation, function or process) that receives a name and a data block, records the name and stores the actual data (content of the data block) in one or more of the underlying mediums. For example, a name received by media access layer 230 may be as shown in the "Name" column in the table shown in FIG. 5 and a data block received may be the digital content of a data block 133 as described. As further shown, media access layer 230 may provide a retrieve function that receives a name and, in response, provides the data block (or the content of the data block 133) associated with the name. More than one data block may be provided in response to a request that includes more than one names. For example, computing device 20-A may be an external device that sends a request to system 200, e.g., a request to retrieve data from, or a request to store data in, system 200 and system 200 may, in response to a request from computing device 20-A, provide a number of data blocks, e.g., from storage devices 30-A and 30-C or store a number of data blocks, e.g., in storage devices 30-A and 30-B.

Likewise, a plurality of data blocks may be provided in a single store request. Accordingly, access layer 230 may support or provide a set or plurality of store and/or retrieve operations for multiple data blocks and/or names based on a single request.

In some embodiments, core module 220 and media access module 230, along with the drives such as drivers 240-A, 240-B and/or 240-C form a data OS. The set of functions exposed, provided and described herein, by the tag or tag set database and media access module 230 forms the application programming interface (API) of the data OS. Higher level APIs that, for example, automatically generate names for data when a storage request is made, chunk data into smaller blocks, compress data, and then invoke requests to both core module 220 and/or media access module 230 may all be provided by the data OS. Data applications can use the interfaces provided by the data OS to store and retrieve data managed by the data OS, and to provide management functions for data stored in a data storage infrastructure based on the data OS.

An example of a data application may be a block storage target that supports a specific block protocol, e.g., Internet Small Computer System Interface (iSCSI). In this example, the iSCSI target data application terminates the iSCSI connection and all further data operations are done using the data OS API.

Reference is made to FIG. 7, which shows a write operation to an iSCSI block storage target according to illustrative embodiments of the present invention. As shown by block 710, data to be stored may be received, e.g., system 200 receives data from computing device 20-A. As shown by block 720, data received may be divided (e.g. broken or chunked) into smaller portions or blocks and names may be generated for the portions, chunks or blocks, e.g., using a function that generates a unique name or code based on the actual content of a data block as described. As further shown, data blocks may be compressed either before or after unique names are generated.

As shown by block 730, sets of tag sets and names may for the portions, chunks or blocks may be added to a database, e.g., new entries may be added to table 510 as described herein. As shown by block 740, the data portions, chunks or blocks may be stored in association with their names, e.g., by calling or invoking media access module 230 to perform the actual storage and providing media access module 230 with names and data blocks.

Figure 9:
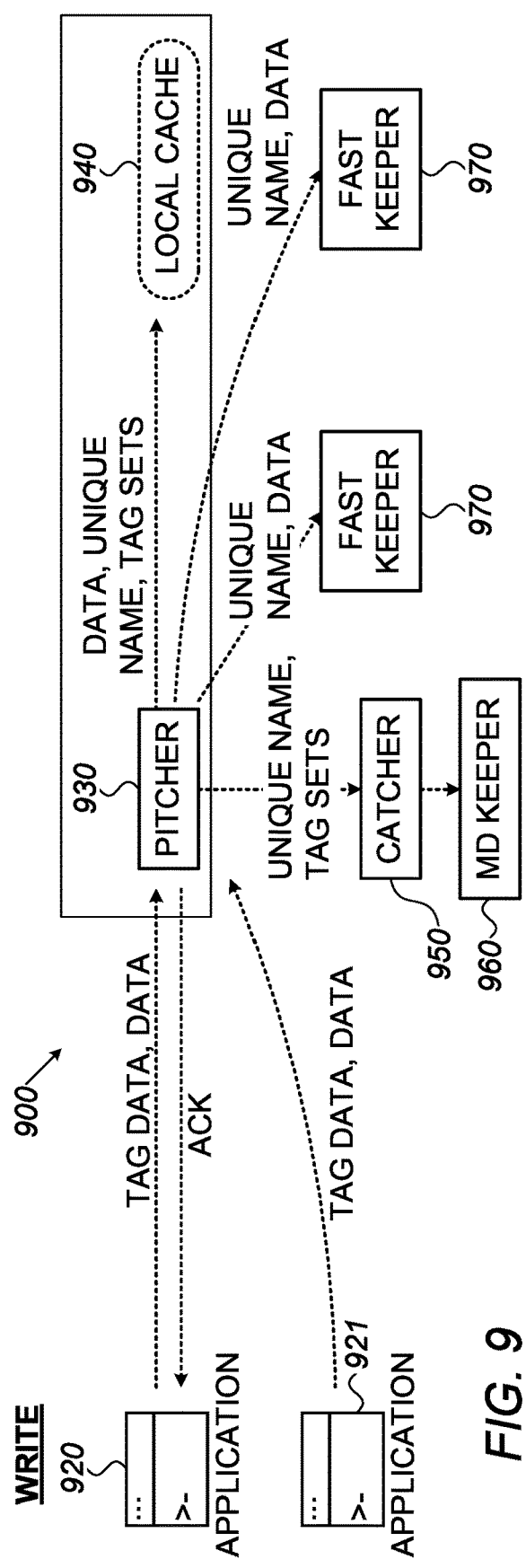
FIG. 9 shows a system and flows according to illustrative embodiments of the present invention.

For example, a data block to be stored may be received by system 200 (e.g., from an application 921 described herein with reference to FIG. 9), system 200 may create a set of tags (tag set) based on information included in the request for storing the data block and may associate the tag set with a unique name. For example, a request to store a data block may include a file name, a volume/offset combination, a size and the like and any part of the information in a request may be used for creating a tag set as described. A system may further generate a unique name for the data block and associate the unique name with the tag set, e.g., by including the unique name in an entry that includes the tag set as described. It is noted that associating a unique name with one or more tag sets may be done using any technique, e.g., pointers may be used. When a request for retrieving the data block is received, system 200 may identify the tag set based on information in the request. For example, a file name in a request may be used to find the relevant tag set since, as described, a tag may include a file name, or it may be created such that it can be matched with file name, e.g., to save storage space and/or increase performance, a tag may include a hash value generated based on a file name. Having identified the correct tag or tag set, a unique name of the data block may be readily obtained since, as described, the unique name may be associated with the tag, the unique name may be used for locating and/or retrieving the data block or provide any other service related to the request, e.g., copy the data block, delete the data block and so on.

Another example of a data application may be an application that copies data according to a point in time, from a block volume (or any other storage system, device or media) to another storage device, system or media. For example, a time tag or timestamp, for each data block 133, may be included in a database, e.g., as illustrated by table 510. Accordingly, an embodiment can find or identify data blocks according to time, e.g., find data blocks that were modified in the last 24 hours, stored in the last week and so on.

Reference is made to FIG. 8, showing a flow of copying data stored in a first (source) storage device, system or media to a second (destination) device, system or media. As shown by block 810, a data volume (or any other storage system, device or media) identifier and a time stamp or indication may be used to query a database (e.g., a database including data as shown by table 510). As shown by block 820, an embodiment (e.g., core module 220) may respond to the query with a list of blocks (and their associated names) that were stored or modified on or before the time indicated in the query. For example, using information in table 510 that may include a timestamp as described and a tag that identifies a data volume (or any other storage system, device or media), core module 220 can find all relevant data blocks as described. As shown by block 830, an embodiment may, for each name included in the response, provide the name to media access module 230 and command media access module 230 to copy the associated data block from the source device or system to the target device or system.

As described, embodiments for managing a storage system may include generating, for a data block, a set of tags (e.g. tag set) and a unique name; associating the tag set and unique name in a database; receiving a request including at least one tag; and providing at least one service related to the data block based on the received tag, tag set and unique name. For example, and as described, core module 220 may generate a unique name for a data block based on the content in the data block, generate or receive a set of tags and store the unique name and set of tags in a database such that the unique name and set of tags are associated or linked. Using services provided by media access module 230, core module 220 may provide services or interfaces based on tag sets and/or unique names.

An embodiment may store a data block in a storage system and may associate information usable for retrieving the data block with the unique name. For example, media access module 230 may receive a data block to be stored and a unique name of the data block, store the data block in a storage system or media and record an association of the location of the data block in the storage system with the unique name. Accordingly, given a unique name, media access module 230 may retrieve the data block from the storage system. Media access layer 230 may perform deduplication of data based on names generated and associated with data blocks as described, for example, by storing a given data block only once if/when multiple store operations are received with the same name.

An embodiment may perform an action related to a data block based on matching (e.g. comparing and determining whether or not the data is identical) data in a request with data in a tag set. For example, specific fields or values in a request from computing device 20-B may be extracted and compared to data in a tag set, if a match is found, that is, the extracted values are same as those in a tag set, the associated data block may be retrieved as described, if a match is not found then an embodiment may perform one or more actions, e.g., a new tag set may be created or the request may be responded with an error message or an error may be logged.

For example, a request may include a set of tags and core module 220 may search for all tag sets that match or are the same as the set of tags in the request and perform an action related to one or more data blocks associated with the matching tag sets.

An embodiment may automatically and/or dynamically modify a tag set. For example, tags may be added, removed or modified to/in tag sets already stored as described such that tag sets are not fixed but are dynamic, e.g., change or evolve as data in storage system 200 changes. For example, when a context is changed, e.g., an owner of data has changed, permissions to access data changed and so on, then core module 220 may modify tag sets associated with the data such that the new context is reflected by the modified tag sets.

An embodiment may associate a data block with a plurality of tag sets, for example, as shown by FIG. 5 and described herein. For example, an association of a data block 133 with a tag set 131 may be, or may include, including the tag set 131 (or at least some of the data in a tag set) and a reference to the data block 133 in the same row of a table or same entry in a list as illustrated in FIG. 5. As further illustrated in FIG. 5, a single or same data block 133 may be associated with any number of tag sets, e.g., using a set of entries in a list or table that associate a data block 133 with a respective set of tag sets. For example, and as shown in FIG. 5, the data block 133 referenced by "0xFB092EE5" may be associated with three different tag sets. Accordingly, a data block may be searched for, selected, used, viewed or manipulated according to a number of different contexts represented by a respective set of tag sets.

An embodiment may alert or notify a client based on a registration, the registration including at least one tag. For example, a client, e.g., an operator of, or an application on, computing device 20-B may register to be alerted if data that is associated with a specific tag or tag set is modified, deleted or accessed and system 200 may, if any data block associated with the tag or tag set indicated in the registration request, is modified, deleted or accessed, alert the operator or application. A client may be considered to be a person operating an application, program or computer, that makes a request, and/or the application, program or computer making the request.

An embodiment may use tag sets or groups and unique names to automate a procedure related to at least one of: data backup, data restore, data copy, periodic maintenance operation and data retention. For example, data application 210 may backup all data blocks associated with a specific tag, perform a retention operation based on tags and so on.

A service provided, executed or performed; or denied, by an embodiment based on a logical context defined by a tag set. For example, although a request to delete data is received, an embodiment may refuse deletion of the data because it is associated with a specific tag. In other cases, an embodiment may change all data blocks associated with one or more tags to read-only thus protecting data based on tags or context.

A service or operation may be executed, performed or selected; or an operation may be refused or denied, based on a context rule applied to a set of tag sets. For example, a context rule may indicate that data including images, stored before Jul. 19, 2017 and used by a specific application must not be deleted. As described, using tag sets, applying (possibly very complex) rules, may be readily performed by embodiments of the invention.

An embodiment may include a layer adapted to provide an interface with a media storage system based on the unique name and the data. For example, a layer in system 200 may provide an interface for storage devices 30-A and 30-B where the interface uses unique names, e.g., a data block stored in storage device 30-C is provided, by the interface layer, in response to a unique name.

An embodiment may include a core unit, module or layer adapted to generate and maintain tag sets and unique names, e.g., core module 220 and a media layer adapted to store and retrieve data blocks according to the unique names, e.g., media access module 230. Generally, a unit, module or layer as referred to herein may be, or may include, a set of instructions or a logic executed by controller 105. An embodiment may further include an Application Programming Interface (API) combining interfaces of the core layer and the media layer. For example, in response to a request from a client, APIs of system 200 may send commands or requests to core module 220 and media access module 230 and generate and provide a response to the client based on responses received from core module 220 and media access module 230. Accordingly, an embodiment may provide a unified interface for a core module and a media module.

A system comprising core module 220, media access module 230, device drivers 240 and storage devices 30 was described herein, other embodiments and/or configurations may be contemplated. Reference is made to FIG. 9 showing a system 900 and flows according to illustrative embodiments of the present invention. As shown, system 900 may interact with applications 920 and 921 that may be executed on computing device 20-A and computing device 20-B shown in FIG. 2. As further shown, system 900 may include a pitcher unit 930, a local cache 940, a catcher unit 950, a metadata (MD) keeper unit 960, and a plurality of fast keeper units 970. Although only two fast keepers 970 are shown it will be understood that any number of fast keepers 970 may be included in or connected to a system according to embodiments of the invention. One of fast keepers 970 may be individually referred to herein as a fast keeper 970, merely for simplicity purposes.

In some embodiments, operations, logic and components included in core module 220 may be performed or included in pitcher 930. For example, pitcher 930 may be the front end of system 900. For example, to perform a write operation, application 920 may send tag data (e.g. metadata) and data (e.g. payload) to pitcher 930 as shown, e.g., as part of a request to store or write the payload data. Tag data may be any metadata usable for generating tags and tag sets as described herein. Tag data provided by application 920 may be any metadata related to the data provided for write or store. Tag data provided by application 920 may be according to, or based on a protocol and/or an application. Generally, tag data provided by application 920 may be structured according to a native language or protocol of application 920. Accordingly, system 900 may provide a first native interface for a first application (e.g., application 920) and system 900 may further provide a second native interface for a second application (e.g., application 921).

For example, application 920 may be an application that uses keys to access objects in a database, that is, the native language or interface of application 920 includes, or is based on keys as known in the art, and, application 921 may be an application that uses objects' identifiers for retrieving objects, e.g., from an object-based storage, that is, the native language or interface of application 921 includes, or is based on unique object identifiers (IDs), yet another application that can readily interface with system 900 may use, as its native language or interface, combinations of volume IDs and offsets, and, an additional application interfacing with system 900 may use file names. Accordingly, using a set of tags (e.g. tag group or set) that are associated with data chunks, blocks or other objects, system 900 can interface with any application or system, allowing the applications that interface with system 900 to maintain their native or natural language or protocol.

Providing a storage system (e.g., system 900) that can interact or interface with a set of different applications that use a respective set of different protocols or interface schemes, without requiring the applications to be modified, configured or adjusted is an improvement of the technological field of computer data storage. Using tag sets as described may enable system 900 to be easily adapted or configured to provide data storage service to any application or system, e.g., provided with details of a protocol or scheme used by an application, tag sets may be created, set and used as described such that requests coming from the application are serviced without any change to the application. A practical application of an embodiment of the invention may be, for example, system 900 that may, as described, generate, for a data block, a set of tags (e.g. tag set) and a unique name, for example, a data block received from application 920 may cause pitcher 930 to create a set of tags and associate the data block with the set of tags. A practical application of an embodiment of the invention may further associate the data block and/or the set of tags with a unique name, identification code, string or value. A practical application of an embodiment may receive a request including at least one tag, e.g., system 900 may receive a request related to a data block stored in system 900 from application 920 where the request includes information that can be translated or related to one or more tag sets as described, and the application may provide at least one service related to the data block based on the received tag information, and based on the unique name, identification code, string or value.

As further described herein, by separating the actual storage of data from the interface with applications, an embodiment of the invention can provide native interfaces to a plurality of application types while using the same efficient storage layer.

As shown, based on the data (e.g. payload) and the tag data, pitcher 930 may calculate or determine a unique name for the payload and a tag set. The tag set calculate or determine may be, for example, tag set 310 as described herein and the unique name may be as shown by block 410 and described herein or the unique name and tag set may be as shown in FIG. 5 and described herein.

As shown, the data (e.g. payload), unique name and tag set may be written to a local cache 940. As further shown, pitcher 930 select one of fast keepers 970 and may provide the data (payload) received from application 920 and the unique name to the selected fast keeper. In some embodiments, operations, logic and components included in storage device drivers 240-A, 240-B and 240-C and operations, logic and components included in storage devices 30-A, 30-B and 30-C may be performed by, connected to, or included in, fast keepers 970. For example, fast keepers 970 may be very fast and efficient since they operate based on an association of a unique name with a data block, that is, fast keepers 970 are unaffected by, or are indifferent to, aspects such as context, application that is the source of the data and so on.

As shown, pitcher 930 may provide the unique name and tag set to catcher unit 950 that may use a metadata keeper 960 to store the unique name and tag set. For example, data shown in table 510 may be stored by metadata keeper 960.

Figure 10:
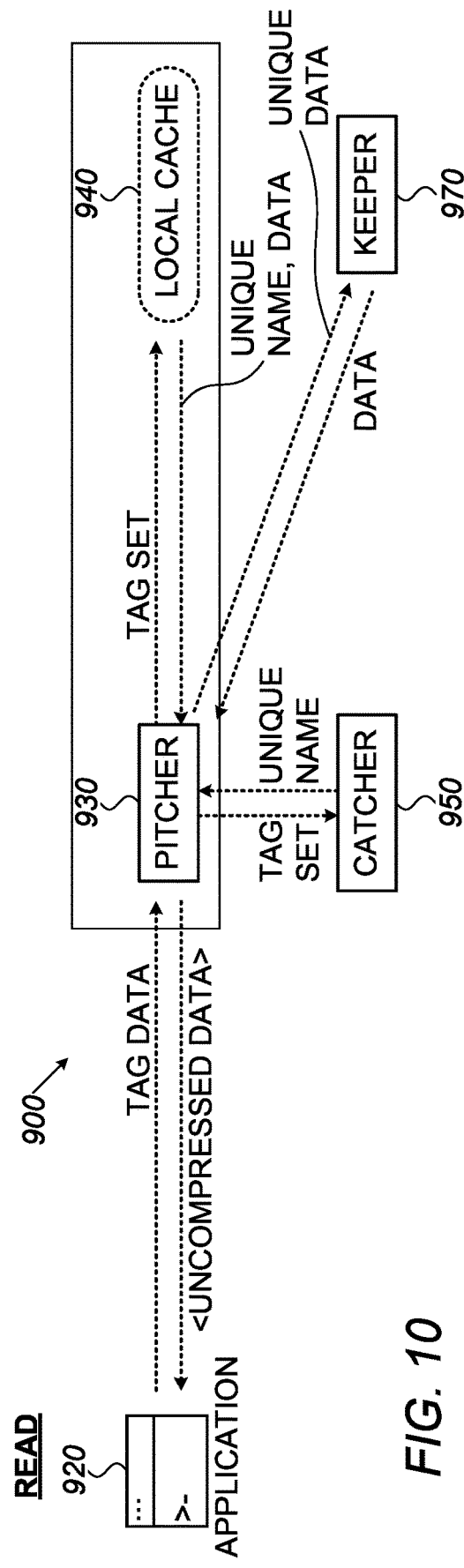
FIG. 10 shows a system and flows according to illustrative embodiments of the present invention.

Reference is made to FIG. 10 showing a system 900 and flows according to illustrative embodiments of the present invention. As shown, to read data from system 900, application 920 may send tag data to pitcher 930. For example, tag data may be a combination of a table name, row and column identifying a data element that application 920 wants to read. Pitcher 930 may use the tag data to calculate a tag set and then use the tag set to check whether or not the requested data is in cache 940 as shown by the arrow extending from pitcher 930 to local cache 940. Cache 940 may store the actual data (payload) and/or it may store a mapping of tag sets to unique names. Accordingly, as shown by the arrow extending from cache 940 to pitcher 930, cache 940 may return the requested data and/or cache 940 may return the unique name of the requested data. In cases where the actual requested data (payload) is stored in cache 940 and is returned from cache 940 to pitcher 930 then pitcher 930 may send the requested data to application 920 thus completing the read cycle.

In cases where the unique name is not found in cache 940, pitcher 930 may send the tag set to catcher 950. Generally, catcher 950 is a metadata management unit that stores an association of tag sets and unique names (e.g., data as shown in table 510). Accordingly, provided with a tag set, catcher 950 may return a unique name to pitcher 930 as shown by the arrow extending from catcher 950 to pitcher 930. Provided with a unique name, pitcher 930 can now send the unique name to keeper 950 as shown and receive, from keeper 970, the actual (requested). A read cycle may be completed by sending the requested data to application 920.

System 900 may perform and/or maintain deduplication of data based on unique names generated and associated with data blocks as described. For example, system 900 may store one, and only one, data block per unique name even if multiple store operations are received with the same name. Since a unique name of a data block may be calculated based on the content of the data block (e.g., the unique name may be a hash value calculated based on the actual content (payload) of a data block), if two or more data blocks have (or are associated with) the same unique name that means that the contents (payload) of the two or more data blocks are identical, that is, the two or more data blocks are duplicates. Accordingly, by identifying data blocks with the same unique names system 900 may identify duplicates, by keeping one, and only one, data block associated with a given unique name system 900 may ascertain that no duplications exist in the system.

For example, pitcher 930 may receive data from application 920, break the data into data blocks and then calculate a unique name for each data block. Pitcher 930 may then select, based on the unique names, keepers 970 for storing each of the data blocks. For example, unique names may be, or may include, a value, thus, a first keeper 970 may be selected if the value included in a unique name is in the range of 0-99, a second, different keeper 970 may be selected if the value included in a unique name is in the range of 100-199 and so on. Selecting a keeper 970 based on a mapping or unique name ranges as described enables scalability that cannot be achieved by systems and methods known in the art. For example, to add keepers 970 to system 900, the above mapping example of ranges can be changed, e.g., instead of two keepers 970 for the range of 0-199 in the above example, three keepers 970 can be used for ranges 0-75, 76-140 and 141-199.

Keepers 970 may discard any duplicates by identifying two or more data blocks with the same unique name and removing data blocks such that one and only one data block associated with the unique name is kept by system 900. It is noted that performing deduplication based on unique names as described is very fast and efficient compared to system and methods that need to compare payloads in order to deduplicate a storage system. Otherwise described, system 900 may remove redundant data blocks (deduplicate) without comparing content of data block. The advantage of deduplication based on unique names as described over systems and methods that need to compare the actual payload of data blocks will be appreciated by a person with ordinary skill in the art.

A mapping of unique name ranges to keepers 970 as described enables fast retrieval if data. For example, equipped with a unique name, pitcher 930 can readily send a retrieve command to the relevant keeper 970 which, as described, can perform a retrieve or read operation extremely fast. Accordingly, a read cycle of system 900 includes a minimal set of simple operations e.g., determining unique name, read data of unique name. In some embodiments, local cache 940 may store data blocks in association with their respective unique names, e.g., in a way similar to the way keepers 970 store data. Accordingly, a read cycle based on a unique name may be completed without having to interact with keepers 970.

It is noted that cache 940 may be used for retrieving the actual (e.g. cached) data as described and/or may be used for caching an association of unique names and tag sets. For example, a copy of table 510 may be stored in cache 940 thus enabling cache 940 to provide pitcher 930 with a unique name based on a tag set received from pitcher 930.

Either pitcher 930 or keeper 970 may compress and/or encrypt a data block prior to storing the data block. Either pitcher 930 or keeper 970 may decompress and/or decrypt a data block prior to providing the data block to application 920. Pitcher 930, local cache 940, catcher 950 and keepers 970 may be executed on a single, same device 100 or they may each be executed on its own device 100. A single catcher 950 may serve a number of pitchers 930, e.g., store tag sets associations with unique names for two or more pitchers 930. A single metadata keeper 960 may serve any number of pitchers 930. In the capacity of metadata storage, catcher 950 may store any metadata, e.g., a history of reads, writes, transactions or any other logs.

Some known storage systems and methods support a specific protocol or language, e.g., an object-based storage system supports object IDs but does not support volume/offset referencing, accordingly, such storage systems and methods force applications to adhere to a specific protocol or language, e.g., to use the storage system, an application must be modified to support the specific protocol or language. Other known storage systems and methods support an application-specific protocol or language, e.g., a proprietary storage system is specifically tailored to support a protocol that is supported by, or is native to, an application.

In contrast, embodiments of the invention, e.g., systems 200 and 900 can serve, or be readily connected to a plurality of applications or systems that require storage services and that support a plurality of different protocols, languages, schemes or conventions. By adding tag sets and associating them with unique names as described, systems 200 and 900 can be easily adapted to support any protocol or interface specifications. Tat sets can be viewed as dictionaries that translate any language, protocol or convention to an internal representation, e.g., one that includes the unique names.

Accordingly, embodiments of the invention can easily be adapted or configured to serve, or communicate with, any application or system using a protocol and/or language that is native to the application or system. For example, a data block containing an image of a person may be associated with a unique name and stored as described. The data block may further be associated with one or more tag sets as described. For example, a first tag set that includes an object identification (object ID) associated with the data block containing the image may be used when serving requests from an application that natively uses object IDs, e.g., an object-based storage application as known in the art. A second tag set that includes a volume ID and offset may be used when serving requests from an application that natively uses volume-offset combinations. Using tag sets association with unique names to provide translation or adaptation layer as described, embodiments of the invention provide storage services to any application or system while using, for all different applications, protocols or languages, the same efficient storage layer (e.g., fast keepers 970, storage device drivers 240 and storage devices 30).

The above protocol examples of object ID and volume and offset addressing are simple ones, it will be understood that far more complex protocols, conventions or languages are enabled by the invention, e.g., tag sets that translate any protocol or interface scheme may be readily defined, set (e.g., in table 510 as described) and used to translate requests from any application using any protocol, interface scheme or convention to an internal representation of data blocks such that an embodiment, e.g., system 900 can readily be adapted to interface with, or provide services to, any application using any communication or interface. Generally, the combination of tag sets and unique names as described may be viewed and uses as a conversion or translation unit, logic or scheme that can translate requests and responses from/to any application thus enabling an embodiment (e.g., system 900) to provide data storage and data retrieval services to any application or system while allowing the application or system to maintain its native language or interface convention, protocol or scheme.

Yet another advantage and improvement provided by embodiments of the invention is the separation between the protocol, scheme or convention used by an application (e.g., applications 920 and 921) and the internal or underlying storage protocol, scheme or convention. For example, natively using files, application 920 may send a file to be stored by system 900, system 900 may include the file name and other information in the request in a tag set and associate the tag set with a unique name that references a volume/offset combination, accordingly, while application 920 users file names as its native language, system 900 may store data for application 920 using a volume/offset paradigm, similarly, using tag sets and unique names to map between requests and responses from/to as application 921, system 900 may use an object-based storage system to store and retrieve data for application 921 even though application 921 uses volume/offsets as its native language. Accordingly and as described, system 900 may provide an application with services according (or that comply or conform) to the native language, paradigm or protocol of the application while the actual, or underlying storage may be according to a different paradigm or protocol.

As described, embodiments of the invention may be, or may include, a controller 105 that may be, for example, a CPU. For example and as described, pitcher 930, catcher 950 and/or keepers 970 may be, or may be software units executed by, controller 105. However, other embodiments, configurations or implementations may be contemplated. For example, one or more graphics processing units (GPUs) may be used, e.g., one or more GPUs may include, or perform functions of, pitcher 930 and/or catcher 950.

Reference is made to FIG. 11 which shows a prior art system 1100 and a system 1150 and flows according to illustrative embodiments of the present invention. As shown by prior art system 1100, to access storage 1130, GPUs 1120 need to go through CPU 1115. For example, and as shown by the IO arrows connecting GPUs 1120 and CPU 1115, if one of GPUs 1120 needs to write data to storage 1130, the GPU sends or passes the data to CPU 1115 who in turn writes the data to storage 1130, similarly, to read data from storage 1130, GPUs 1120 must use, or go through, CPU 1115.

The abstraction of a storage system enabled by embodiments of the invention enables GPUs to function as pitcher 930 and/or as catcher 950 and thus natively use keepers 970. The separation of the actual storage operations (read data from a storage device, write data to a storage device, delete or modify data) from the interface provided to clients enabled by embodiments of the invention as described enables eliminating storage performance bottlenecks and thus improve a storage system.

Some embodiments of the invention enable multiple GPU direct fabric storage (DFS). For example, in system 1150, GPUs 1155 may be configured to perform operations and logic of pitcher 930 and/or of catcher 950 and storage 1160 may be, or may include, one or more keepers 970. For example, to write data to storage 1160, instead of going through a CPU (as required in prior art system 1100, a GPU 1155 may compute a unique name and send the data and unique name to a keeper 970 included in storage system 1160. A GPU 1155 may further generate tag sets for a data block and associate the tag sets with unique name, e.g., as described herein with respect to pitcher 930. To read data, a GPU 1155 may send a unique name to a keeper 970 in storage system 1160. Accordingly, embodiments of the invention enable a GPU to directly access a storage system (DFS), without requiring an intermediate CPU. Advantages of direct access to storage (or DFS) for GPUs may be readily appreciated, for example, bypassing a CPU as described increases speed of operations as well as decreases CPU load.

Storage system 1160 may include any number of keepers 970 and a GPU 1155 may interact with any number of keepers 970, e.g., based on a first unique name of a first data block, a GPU 1155 may select a first keeper 970 in storage system 1160 and the GPU 1155 may select a second, different keeper 970 based on a second, different unique name calculated, by the GPU 1155, for a second data block.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention. Various embodiments have been presented. Each of these embodiments may of course include features from other embodiments presented, and embodiments not specifically described may include various features described herein.

The invention claimed is:

1. A computer-implemented method of managing a storage system, the method comprising:
generating, for a single data block, a unique name and a plurality of different sets of tags associated with a plurality of different respective applications;
associating the plurality of different sets of tags and the unique name for the single data block in a database;
translating a request including at least one tag from any of the plurality of the different sets of tags associated with any of the plurality of different respective applications to the unique name generated for the single data block;
storing or retrieving the single data block based on the received at least one tag from any of the plurality of the different sets of tags and the unique name for the single data block in the database,
thereby providing native interfaces to the plurality of different respective applications.

2. The method of claim 1 comprising translating requests identifying the single data block from any of the plurality of sets of tags using any respective protocol to the unique name of the single data block.

3. The method of claim 1 comprising generating a first and second sets of the plurality of sets of tags for a first and second respective native interfaces for a first and second respective applications.

4. The method of claim 3, wherein the first set of tags identifies the single data block by a block volume tag and an offset tag and a second set of tags identifies the single data block by a file tag and a data chunk tag.

5. The method of claim 1, wherein the plurality of sets of tags identifies the single data block using the plurality of different respective protocols selected from the group consisting of: keys, unique object identifiers (IDs), volume IDs and offsets, and file names.

6. The method of claim 1 comprising dynamically modifying the plurality of sets of tags by adding a new set of tags to the plurality of sets of tags generated for the single data block.

7. The method of claim 1 comprising dynamically modifying the plurality of sets of tags by removing a set of tags from the plurality of sets of tags generated for the single data block.

8. A system comprising:
a memory; and
one or more processors configured to:
generate, for a single data block, a unique name and a plurality of different sets of tags associated with a plurality of different respective applications,
associate the plurality of different sets of tags and the unique name for the single data block in a database;
translate a request including at least one tag from any of the plurality of the different sets of tags associated with any of the plurality of different respective applications to the unique name generated for the single data block, and
store or retrieve the single data block based on the received at least one tag from any of the plurality of the different sets of tags, and the unique name for the single data block in the database,
thereby providing native interfaces to the plurality of different respective applications.

9. The system of claim 8, wherein the one or more processors are configured to translate requests identifying the single data block from any of the plurality of sets of tags using any respective protocol to the unique name of the single data block.

10. The system of claim 8, wherein the one or more processors are configured to generate a first and second sets of the plurality of sets of tags for a first and second respective native interfaces for a first and second respective applications.

11. The system of claim 10, wherein the first set of tags identifies the single data block by a block volume tag and an offset tag and a second set of tags identifies the single data block by a file tag and a data chunk tag.

12. The system of claim 8, wherein the plurality of sets of tags identifies the single data block using the plurality of different respective protocols selected from the group consisting of: keys, unique object identifiers (IDs), volume IDs and offsets, and file names.

13. The system of claim 8, wherein the one or more processors are configured to dynamically modify the plurality of sets of tags by adding a new set of tags to the plurality of sets of tags generated for the single data block.

14. The system of claim 8, wherein the one or more processors are configured to dynamically modify the plurality of sets of tags by removing a set of tags from the plurality of sets of tags generated for the single data block.

15. A computer non-transitory storage medium having stored thereon instructions which when executed cause one or more processors to:
generate, for a single data block, a unique name and a plurality of different sets of tags associated with a plurality of different respective applications;
associate the plurality of different sets of tags and the unique name for the single data block in a database;
translate a request including at least one tag from any of the plurality of the different sets of tags associated with any of the plurality of different respective applications to the unique name generated for the single data block; and
store or retrieve the single data block based on the received at least one tag from any of the plurality of the different sets of tags and the unique name for the single data block in the database,
thereby providing native interfaces to the plurality of different respective applications.

16. The computer non-transitory storage medium of claim 15, wherein the instructions stored thereon when executed cause the one or more processors to translate requests identifying the single data block from any of the plurality of sets of tags using any respective protocol to the unique name of the single data block.

17. The computer non-transitory storage medium of claim 15, wherein the instructions stored thereon when executed cause the one or more processors to generate a first and second sets of the plurality of sets of tags for a first and second respective native interfaces for a first and second respective applications.

18. The computer non-transitory storage medium of claim 17, wherein the first set of tags identifies the single data block by a block volume tag and an offset tag and a second set of tags identifies the single data block by a file tag and a data chunk tag.

19. The computer non-transitory storage medium of claim 15, wherein the plurality of sets of tags identifies the single data block using the plurality of different respective protocols selected from the group consisting of: keys, unique object identifiers (IDs), volume IDs and offsets, and file names.

20. The computer non-transitory storage medium of claim 15, wherein the instructions stored thereon when executed cause the one or more processors to dynamically modify the plurality of sets of tags by adding a new set of tags to, or removing a set of tags from, the plurality of sets of tags generated for the single data block.

\* \* \* \* \*